Dec. 20, 1938.   R. G. DICKENS   2,140,737
CLUTCH
Filed Dec. 17, 1936
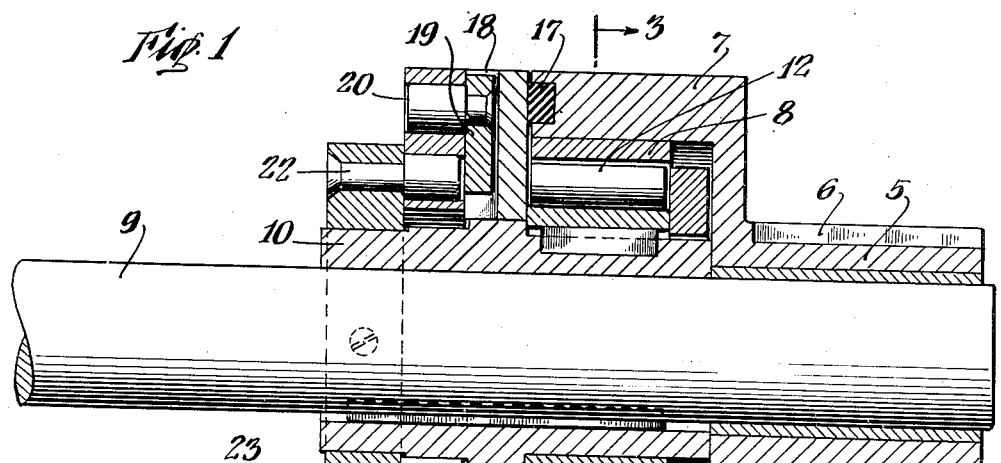
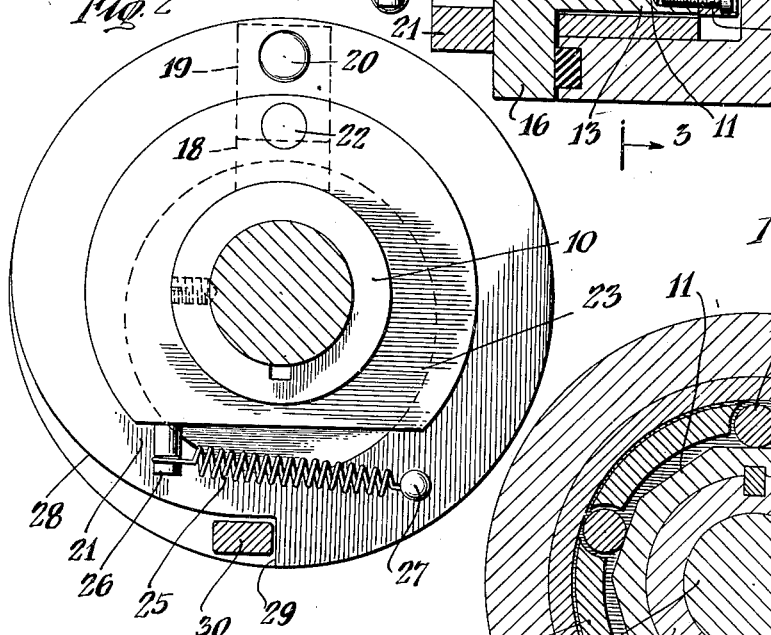
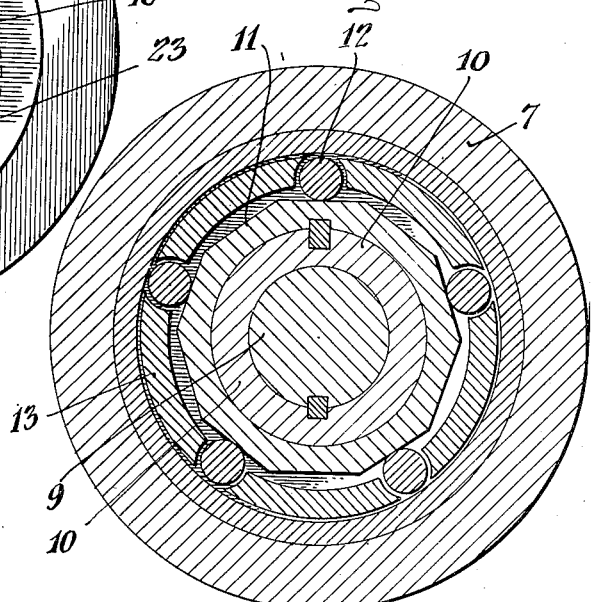
INVENTOR
Richard G. Dickens
BY
Duell, Kane + Smart
ATTORNEYS Patented Dec. 20, 1938

2,140,737

UNITED STATES PATENT OFFICE 2,140,737

CLUTCH

Richard Griffith Dickens, Elmira Heights, N. Y., assignor to The Hilliard Corporation, Elmira, N. Y., a corporation of New York Application December 17, 1936, Serial No. 116,275

7 Claims. (Cl. 192—27)

This invention relates to a functionally and structurally improved clutch.

It is an object of the invention to furnish a unit of this character in which the parts may be arranged and rearranged so as to have an extremely long period of effective usefulness. Moreover, the construction is such that the adjustment or rearrangement of the parts may be accomplished by relatively unskilled employees and by the use of conventional tools, and with the expenditure of minimum time and effort.

A further object of the invention is that of providing a clutch, the parts of which may readily be engaged and disengaged in an extremely positive manner.

Another object is that of furnishing a clutch, the several units of which may be produced largely by conventional manufacturing methods and practices as heretofore followed, such units, moreover, being relatively few in number and each individually simple and rugged in construction, thus furnishing a clutch which may be produced at relatively nominal cost.

An additional object is that of furnishing a clutch of the so-called single revolution type. In other words, a unit constructed in accordance with the teachings of the present invention may rotate any desired number of times or for any desired interval, but by means of the present invention there is provided a clutch, the structure of which is ideally suited and designed to couple a driving and driven member merely for a single revolution, such members being thereafter automatically disconnected until a further and deliberate actuation occurs.

With these and other objects in mind, reference is had to the attached sheet of drawing illustrating one practical embodiment of the invention, and in which:

Fig. 1 is a longitudinal section;

Fig. 2 is a side elevation; and

Fig. 3 is a sectional side view taken along the line 3—3 and in the direction of the arrows as indicated in Fig. 1.

In these views, the numeral 5 indicates the collar of a driving member which to this end may be formed with a keyway 6 to receive a driving sleeve, tube, or the hub of a driving wheel (not shown). The driving member is continued in the form of an enlarged casing 7, the inner face of which may be lined with a layer 8 of suitable contact material, should this be desired. Mounted for rotation with respect to the driving member is a shaft 9, which may extend into the bore of hub 5 to rotatably engage the same. Secured against movement with respect to shaft 9 is a sleeve 10, which, in turn, fixedly mounts a cam 11.

Supported upon alternate cam faces are rollers 12 which are retained against undue displacement by a collar or confining ring 13, having openings such that portions of the rollers may be projected to extend beyond the same and into engagement with the layer 8. Member 13 may be secured in position by means of a plate 14, which rotatably encircles the sleeve 10; such plate being attached to member 13 in any desired manner, as, for example, by bolts 15. The confining member 13 has its several sections integral or otherwise fixed with respect to a plate 16, which rotatably encircles sleeve 10.

It is thus obvious that if plate 16 be rotated with respect to shaft 9, that it will effect rotation of the cage or confining member 13 and cause rollers 12 to shift along the cam faces with which they contact, so as to be projected outwardly and into engagement with the layer 8. If desired, the edge of casing 7 may be grooved to receive a layer of oil retaining material 17, to which oil may be supplied in any desired manner. The outer face of this layer will, of course, contact the inner face of plate 16 and its body will act to confine the lubricant within the assembly.

Now with a view to effecting a deliberate shifting of plate 16 and the parts associated therewith, with respect to the shaft 9 and the parts associated with it, it will be observed that the outer face of plate 16 may be formed with a radially extending groove or slot 18. Disposed within this slot is a block 19 pivotally supported by a pin 20 mounted by a cam plate 21. This plate encircles sleeve 10 and is supported by a pin 22 which is mounted upon a hub plate 23. The latter is fixed with respect to sleeve 10 in any desired manner. One end of a spring 25 is secured to the hub plate 23, as, for example, by being fastened to a pin 26 extending therefrom, and the opposite end of this spring is secured to a pin 27 fixed to cam plate 21. Finally, it will be observed that the periphery of this latter plate is formed with a cam surface 28, culminating in a raised portion or shoulder 29 with which a trip bar or rod 30 may engage.

In operation, it will be understood that the spring 25 tends to contract. With sleeve 10 fixed with respect to the shaft 9 and having one end of this spring connected to it, it is obvious that there will be a constant tendency on the part of cam plate 21 to be swung with respect to the shaft so that through block 19 and groove 18 the plate 16 will shift the cage 13. This will, of course, result in the rollers 12 moving over the surfaces of cam 11 to firmly bind against or connect with the layer 8.

It is obvious that the greater the load the greater will be the gripping tendency, but in any event the position of the parts will be maintained incident to the constant force exerted by spring 25. In clutches of similar type as heretofore constructed, it has some times been difficult to disengage the clutch parts because of the intimacy with which they contact one another. However, by the present construction and incident to the relatively great leverage exerted, it is apparent that by simply swinging cam plate 21 the confining member 13 will positively force rollers to positions at which they are substantially equi-distant between the high points of cam 11. As a consequence the clutch parts may be uncoupled with only negligible effort. Thus it will be seen that cam plate 21 functions as a lever, the long arm of which is urged, under the influence of spring 25, to swing the short arm in a pre-determined direction and around pin 22. This short arm carries pin 20 coupled to block 19 and the latter riding within groove 18 of plate 16 tends to maintain the clutch parts in engaged position. This effect, however, may be completely counteracted by simply swinging what might be termed the long arm of the lever provided by cam plate 21 in a direction opposite to that in which spring 25 tends to move it.

According to the present invention, if the parts wear, it is contemplated that renewal thereof may be achieved within minimum effort and expense. Thus, due to the fact that rollers 12 only engage alternate faces of cam 11, it is apparent that the clutch portions may be separated upon wear occurring, and the rollers shifted to contact the next series of faces of cam 11. Thereupon, the clutch may again be operated. If further wear occurs, it is only necessary to again separate the clutch parts and effect relative reversal thereof. In other words, where in the sample under consideration a clockwise turning of casing 7 (as viewed in Figs. 2 and 3) will result in the rollers moving toward the right hand zones of the surfaces of cam 11, the parts upon being relatively reversed will cause the rollers to move to what has heretofore been the left hand zones of the cam surfaces. Consequently, fresh surfaces are presented and after these are in turn worn, the rollers may again be shifted to engage the next succeeding series of faces.

If the unit is to be operated as a single revolution clutch, it will be understood that by simply employing an actuator 30 the plate 16 will be caused to have a relatively counter-clockwise movement with respect to the remaining parts. This movement will cause disengagement of the clutch parts. Thereupon, by withdrawing the actuator 30, the spring will cause firm engagement of these clutch parts. In the interim the actuator will ride against the surface of cam plate 21 and will finally engage shoulder or stop 29 of plate 21. At that instant it will cause a shifting of the cam plate again resulting in a disengagement of the clutch parts.

Thus, among others, the several objects aforenoted are achieved. It is apparent that numerous changes in construction and rearrangement of the parts might be resorted to without departing from the spirit of the invention as defined by the claims.

Having described my invention, what I claim as new and desire to secure by Letters Patent is:

1. A clutch including a shaft, a sleeve secured to said shaft, a cam secured against movement with respect to said sleeve, a casing inclosing said cam, a rotatable element interposed between said cam and the inner face of said casing and to be forced by the former into coupling contact with the latter, a lever pivotally mounted with respect to said sleeve and presenting a short and a long arm, means connecting the short arm of said lever to said element to shift the same into inoperative position, and means cooperating with the long arm of said lever to constantly urge said rotatable element into a position at which it operatively engages the surfaces of both said cam and casing.

2. A clutch including a shaft, a sleeve secured to said shaft, a cam secured against movement with respect to said sleeve, a casing enclosing said cam, a rotatable element interposed between said cam and the inner face of said casing and to be forced by the former into coupling contact with the latter, a lever pivotally mounted with respect to said sleeve and presenting a short and a long arm, means connecting the short arm of said lever to said element to shift the same into inoperative position, and a spring having one of its ends connected to said sleeve, its opposite end being connected to the long arm of said lever to constantly urge said rotatable element to a position at which it operatively engages the surface of both said casing and cam.

3. A clutch including a sleeve to be affixed to a shaft, a cam presenting a plurality of faces fixed with respect to said sleeve, a casing inclosing said cam, a plurality of rotatable elements interposed between the cam faces and the inner face of said casing, confining means for said elements, a plate rotatable with respect to said sleeve and coupled to said confining means, said plate being formed with a slot, a lever rockingly mounted with respect to said sleeve, and a pin secured to said lever and riding within said slot.

4. A clutch including a sleeve to be affixed to a shaft, a cam presenting a plurality of faces fixed with respect to said sleeve, a casing inclosing said cam, a plurality of rotatable elements interposed between the cam faces and the inner face of said casing, confining means for said elements, a plate rotatable with respect to said sleeve and coupled to said confining means, said plate being formed with a slot, a lever rockingly mounted with respect to said sleeve, a pin secured to said lever and riding within said slot and a spring connected to said lever to cause said pin to shift said confining member to a position at which said rotatable elements engage the surfaces of both said cam and casing.

5. A clutch including a sleeve to be affixed to a shaft, a cam presenting a plurality of faces fixed with respect to said sleeve, a casing inclosing said cam, a plurality of rotatable elements interposed between the cam faces and the inner face of said casing, confining means for said elements, a plate rotatable with respect to said sleeve and coupled to said confining means, said plate being formed with a slot, a lever rockingly mounted with respect to said sleeve, a pin secured to said lever and riding within said slot, a spring connected to said lever to cause said pin to shift said confining means to a position at which said rotatable elements engage the surfaces of both said cam and casing, and means forming a part of said lever whereby the same may be shifted against the tendency of said spring.

6. A clutch including a sleeve to be affixed to a shaft, a cam presenting a plurality of faces fixed with respect to said sleeve, a casing inclosing said cam, a plurality of rotatable elements interposed between the cam faces and the inner face of said casing, confining means for said elements, a plate rotatable with respect to said sleeve and coupled to said confining means, said plate being formed with a slot, a block slidably mounted within said slot, a lever pivotally mounted by said sleeve and presenting long and short arms, a pin associated with the short arm of said lever and mounting said block, and a spring connected to the long arm of said lever to cause said block to urge said plate and confining means to a position at which said rotatable elements engage said casing and cam surfaces.

7. A clutch including a sleeve, a cam presenting a plurality of faces and secured against movement with respect to said sleeve, a casing inclosing said cam, rotatable elements of a number less than the number of cam surfaces and disposed between the faces of said cam and said casing face, means whereby said rotatable elements may be removed from contact with the surfaces of said cam and shifted to contact new faces of the same, a lever pivotally mounted with respect to said sleeve and presenting a short and a long arm, means connecting the short arm of said lever to said rotatable elements to shift the same into inoperative position, and means cooperating with the long arm of said lever to constantly urge said rotatable elements into a position at which they operatively engage the surfaces of both said cam and casing.

RICHARD GRIFFITH DICKENS.